(12) United States Patent
McCombs, Jr. et al.

(10) Patent No.: US 12,670,062 B2
(45) Date of Patent: Jun. 30, 2026

(54) OPTIMIZED ERROR CORRECTION CODE ARCHITECTURE FOR MEMORY

(71) Applicant: Arm Limited, Cambridge (GB)

(72) Inventors: Edward Martin McCombs, Jr., Austin, TX (US); Andrew David Tune, Dronfield (GB); Sean James Salisbury, Dendron (GB); Akshay Kumar, New Delhi (IN)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 18/673,743

(22) Filed: May 24, 2024

(65) Prior Publication Data

US 2025/0362999 A1    Nov. 27, 2025

(51) Int. Cl.
*G06F 11/00* (2006.01)
*G06F 11/10* (2006.01)

(52) U.S. Cl.
CPC ................................. *G06F 11/1044* (2013.01)

(58) Field of Classification Search
CPC ............. G06F 11/1044; G06F 11/0727; G06F 11/1016
See application file for complete search history.

(56) References Cited

U.S. PATENT DOCUMENTS

| | | | |
|---|---|---|---|
| 6,038,693 A | 3/2000 | Zhang | |
| 6,215,685 B1 * | 4/2001 | Fung ...................... | G11C 15/04 |
| | | | 365/49.16 |
| 6,662,333 B1 | 12/2003 | Zhang et al. | |
| 2005/0265061 A1 | 12/2005 | Kim | |
| 2014/0059403 A1 * | 2/2014 | Sommer ........... | H03M 13/6337 |
| | | | 714/E11.032 |
| 2015/0019840 A1 | 1/2015 | Anderson et al. | |
| 2017/0060678 A1 | 3/2017 | Jeganathan et al. | |
| 2019/0188078 A1 | 6/2019 | Yu et al. | |
| 2020/0371866 A1 * | 11/2020 | Kadowaki ........... | G06F 11/1016 |
| 2022/0091992 A1 | 3/2022 | Shanbhogue et al. | |
| 2023/0195565 A1 | 6/2023 | Shankar et al. | |
| 2023/0342240 A1 * | 10/2023 | Jain ...................... | G06F 11/1048 |
| 2024/0185942 A1 * | 6/2024 | Lee ........................ | G11C 29/42 |

OTHER PUBLICATIONS

Daniel Moreau et al. "Practical Way Halting by Speculatively Accessing Halt Tags" 2016 Design, Automation & Test in Europe Conference & Exhibition (DATE), Mar. 14, 2016, 7 pages.

Faissal M. Sleiman et al. "Embedded Way Prediction for Last-Level Caches" 2012 IEEE 30th International Conference on Computer Design (ICCD), Sep. 3, 2012, 8 pages.

(Continued)

*Primary Examiner* — Joseph D Manoskey

(74) *Attorney, Agent, or Firm* — Talem IP Law, LLP

(57) ABSTRACT

A memory circuitry with optimized error correction code architecture includes a memory array; a wordline driver, the wordline driver coupled to receive an address and select a corresponding wordline of the memory array; read circuitry coupled to bitlines of the memory array; and error correction code (ECC) logic coupled to receive outputs of a set of columns selected by the read circuitry. The ECC logic performs a partial decoding of the outputs to output a partial ECC result that represents if there is an error and where that error is located.

20 Claims, 8 Drawing Sheets

(56) References Cited

OTHER PUBLICATIONS

Chuanjun Zhang et al. "A Way-Halting Cache for Low-Energy High-Performance Systems" ACM Transactions on Architecture and Code Optimization, Mar. 2005, 21 pages, vol. 2, No. 1.

Chuanjun Zhang et al. "A Way-Halting Cache for Low-Energy High-Performance Systems" Proceedings of the 2004 International Symposium on Low Power Electronics and Design, Aug. 11, 2004, 4 pages.

Abhishek Das et al. "A Single Error Correcting Code with One-Step Group Partitioned Decoding Based on Shared Majority-Vote" Electronics, 2020, 14 pages, vol. 9, Issue 709.

International Search Report and Written Opinion issued in International Application No. PCT/GB2025/051091, mailed Aug. 14, 2025, 18 pages.

Mathuranathan, "Hamming Code: Construction, Encoding & Decoding," GaussianWaves, May 23, 2008, Retrieved: Jul. 24, 2025, 14 pages, Retrieved from: https://www.gaussianwaves.com/2008/05/hamming-codes-how-it-works/.

Technical Aspects of Multimodal Systems (TAMS), "Hamming Code Demonstration," Universitat Hamburg, Nov. 24, 2006, 2 pages, Retrieved: Jul. 24, 2025, Retrieved from: https://tams.informatik.uni-hamburg.de/applets/hades/webdemos/10-gates/50-hamming/hamming_print.html.

* cited by examiner

OPTIMIZED ERROR CORRECTION CODE ARCHITECTURE FOR MEMORY

BACKGROUND

Cache memory and other memory subsystems can be located relatively close to a processor to provide fast access of frequently used data to the processor. Random Access Memory (RAM), and specifically Static Random Access Memory (SRAM), is typically the type of memory used for these memory subsystems. SRAM is generally configured as an array, or matrix, of memory units that are individually addressable.

Memory can be set-associative and organized by index and way. A cacheline refers to the data corresponding to a memory address. A set refers to a limited number of places in the memory where a cacheline can reside (e.g., if associativity is equal to 1, the memory is considered to be "direct mapped"). Each associativity corresponds to a "way". For example, an associativity of 2 corresponds to two ways, an associativity of 4 corresponds to four ways, and an associativity of 16 corresponds to 16 ways. The index indicates which set a cacheline is stored or is to be stored into and is computed from the address. A tag refers to part of the address that is stored in the tag RAM and identifies, in conjunction with the index, the memory address that the cacheline corresponds with.

To find whether a memory address is in the cache memory or other memory subsystem, a lookup operation can be performed in the tag RAMs. As part of the lookup operation, a portion of an incoming address (e.g., the portion providing the tag function) is compared to the stored tags in the tag RAMs. A "hit" occurs when the incoming address (e.g., the portion providing the tag function) matches a stored tag in a way and the stored tag is considered valid (e.g., as per appropriate state bits(s)). In a typical n-way set-associative cache, data belonging to an address will be in 0 or 1 of n places. Based on the hit of the incoming tag portion with a tag in the tag RAM, the appropriate data RAM can be accessed. For a typical way-halting cache there is an attempt to reduce the number of bits of the tags that are accessed in each way. Thus, if there is any partial mismatch during the lookup (a "miss"), accesses to that way are halted, saving power by not accessing the full tag address lookup.

Accessing memory, such as RAM, utilizes large amounts of energy when multiple ways are accessed all at once using an incoming address to find a matching address that may be in one way of the memory. A process that can locate the desired tag while accessing a minimal number of ways has the potential to save a substantial amount of energy.

BRIEF SUMMARY

Optimized error correction code (ECC) architecture for memory is provided. ECC bits are often stored with data in memory to assist with detecting (and possibly correcting) bit flips in the stored data. The described ECC architecture incorporates certain ECC logic within a memory, enabling power savings and, in some cases, faster operations.

A memory circuitry with optimized ECC architecture includes a memory array; a wordline driver, the wordline driver coupled to receive an address and select a corresponding wordline of the memory array; read circuitry coupled to bitlines of the memory array; and ECC logic coupled to receive outputs of a set of columns selected by the read circuitry. The ECC logic performs a partial decoding of the outputs to output a partial ECC result that represents if there is an error and where that error is located.

A method of operating a memory circuitry with optimized ECC architecture includes storing data and ECC bits encoding error information of the data in a memory array of the memory circuitry; receiving an address at the memory circuitry; selecting, by a wordline driver coupled to receive the address, a corresponding wordline of the memory array; and performing, by ECC logic of the memory circuitry, a partial decoding of output of a set of columns selected by read circuitry of the memory circuitry to output a partial ECC result that represents if there is an error and where that error is located. The set of columns selected by the read circuitry correspond to columns in which the data and ECC bits are stored in the memory array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Optimized error correction code (ECC) architecture for memory is provided. ECC bits are often stored with data in memory to assist with detecting (and possibly correcting) bit flips in the stored data. The described ECC architecture incorporates certain ECC logic within a memory, enabling power savings and, in some cases, faster operations.

Traditional ECC can be extremely wasteful as the ECC bits are just added to the data fields stored in the memory (e.g., across a full way or set) and are read out during an access along with the data for transport to the logic performing the ECC calculations. By incorporating some ECC logic in memory circuitry, it is possible to avoid reading out all the data from the memory. As such, the switching power of the full calculation of ECC and the power associated with transport of the data from memory across a chip to the logic performing the full calculation of ECC outside the memory can be reduced. In addition, when the ECC logic described herein is incorporated in memory storing tag data of one or more ways, it is possible to implement tag way halting optimized for speed and power savings.

Figure 1:
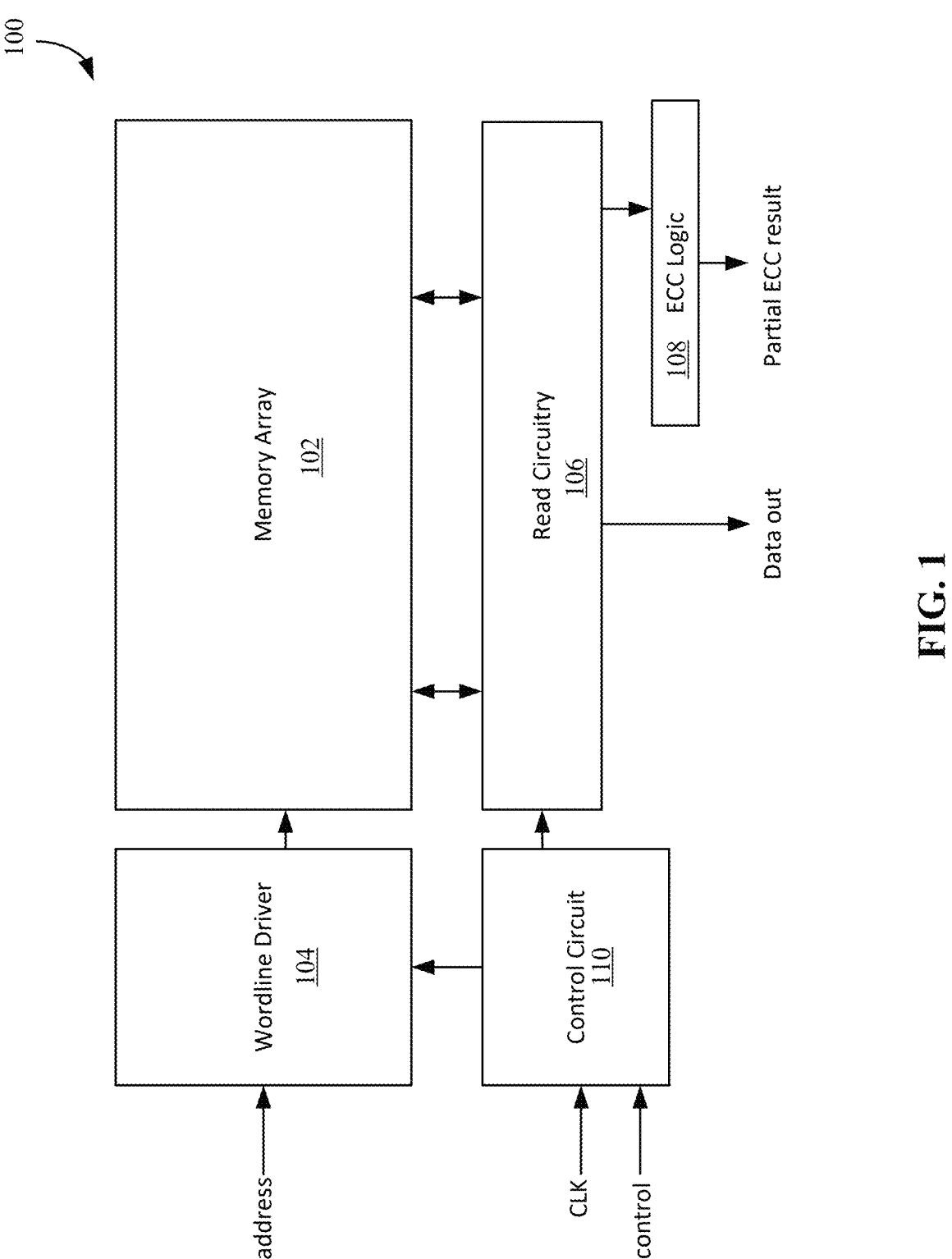
FIG. 1 illustrates a representational diagram of a memory circuitry with optimized ECC architecture.

FIG. 1 illustrates a representational diagram of a memory circuitry with optimized ECC architecture. Referring to FIG. 1, a memory circuitry 100 with optimized ECC architecture includes a memory array 102; a wordline driver 104; read circuitry 106 coupled to bitlines of the memory array 102; and error correction code (ECC) logic 108 coupled to receive outputs of a set of columns selected by the read circuitry 106. The wordline driver 104, read circuitry 106, and ECC logic 108 can operate under control of a control circuit 110.

Control circuit 110 receives a clock signal and a control/ enable signal, among other inputs, and generates outputs to control the other circuitry of the memory circuitry 100. The clock signal indicates the start of an operation for memory and provides the operating frequency for the circuitry. The control/enable signal can indicate a start of an operation for memory whether the memory will be accessed or not. Other inputs to the control circuit can include address information (not shown) so that column select signals can be generated by the control circuit.

The wordline driver 104 is coupled to receive an address and select a corresponding wordline of the memory array.

The ECC logic 108 performs a partial decoding of the outputs to output a partial ECC result that represents if there is an error and where that error is located. The ECC logic performs part of an ECC algorithm. That is, ECC logic 108 is not the logic for the full ECC algorithm from which the ECC logic forms a part.

Figure 2A:
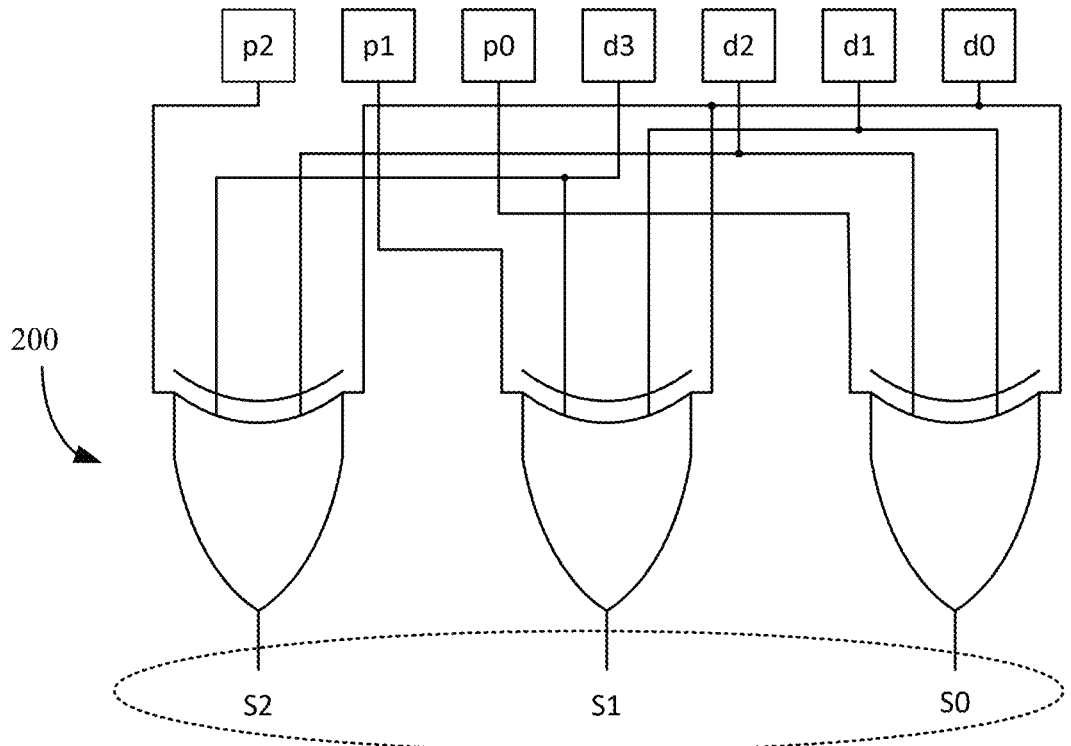
FIG. 2A illustrates an example ECC logic providing a partial ECC result.

The ECC logic 108 can include syndrome computation logic (with the output being a syndrome). In some cases, the ECC logic 108 includes part of a hamming code logic. In some cases, the ECC logic 108 includes partial decoding operations. An example of ECC logic 108 is shown in FIG. 2A. In some cases, the ECC logic 108 includes XOR gates.

Accordingly, a method of operating a memory circuitry 100 with optimized error correction code architecture can include storing data and ECC bits encoding error information of the data in a memory array 102 of the memory circuitry 100; receiving an address at the memory circuitry 100; selecting, by a wordline driver 104 coupled to receive the address, a corresponding wordline of the memory array; and performing, by ECC logic 108 of the memory circuitry 100, a partial decoding of output of a set of columns selected by read circuitry 106 of the memory circuitry to output a partial ECC result that represents if there is an error and where that error is located (e.g., in a row corresponding to the corresponding wordline selected by the wordline driver 104), wherein the set of columns selected by the read circuitry 106 correspond to columns in which the data and ECC bits are stored in the memory array 102.

In some cases, the set of columns to which the ECC logic 108 is coupled is a specific number of columns set aside for storing ECC bits in the memory array 102. In some cases, the memory array 102 is structured to store a plurality of ECC bits, for example, up to 6 or 7 ECC bits in a row, the set of columns coupled to the ECC logic being 6 or 7 columns corresponding to a location of the 6 or 7 ECC bits of each row.

Figure 2B:
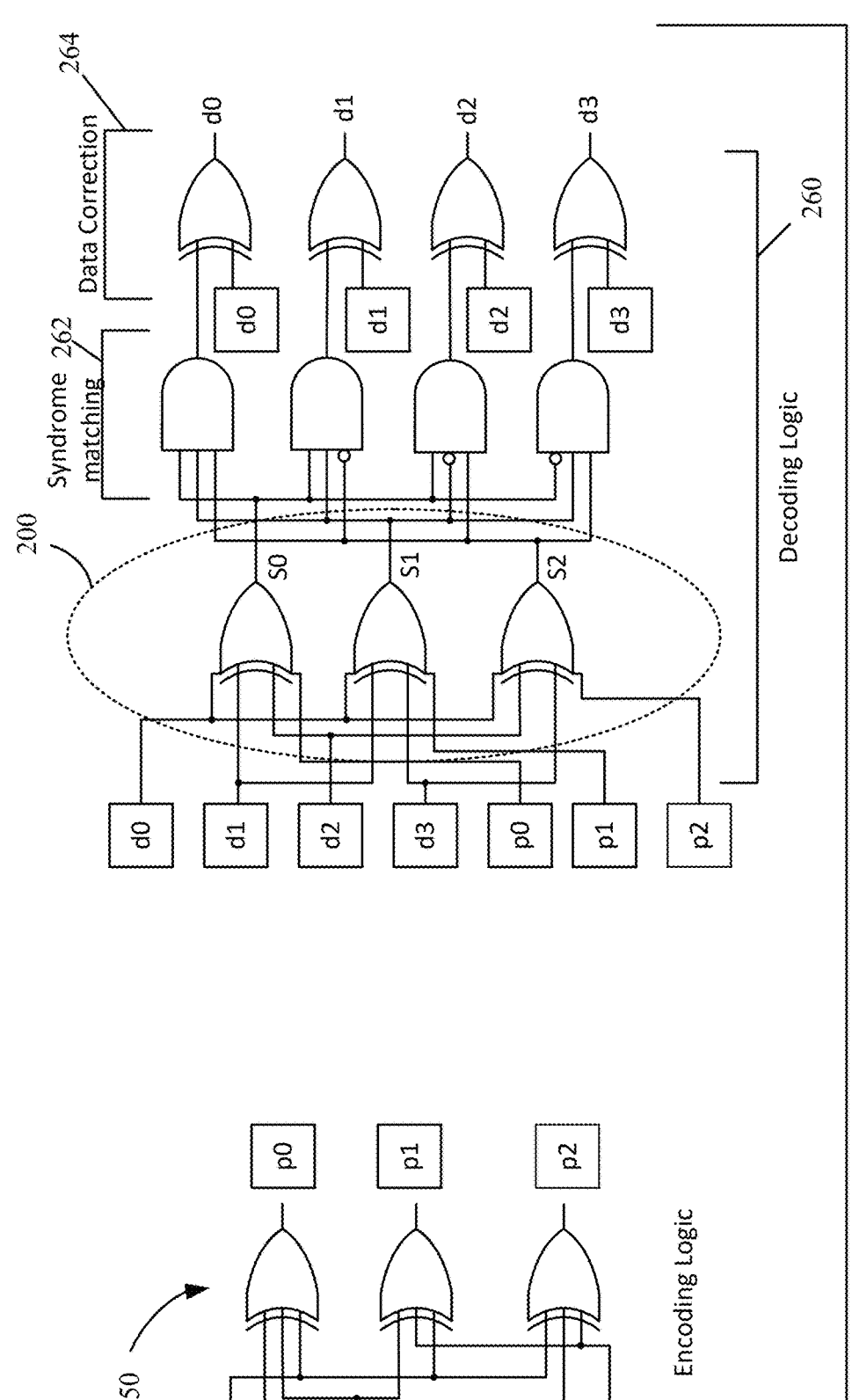
FIG. 2B illustrates example circuitry implementing an error correcting code algorithm in which the ECC logic of FIG. 2A can be used.

FIG. 2A illustrates an example ECC logic providing a partial ECC result; and FIG. 2B illustrates example circuitry implementing an error correcting code algorithm in which the ECC logic of FIG. 2A can be used.

Referring to FIG. 2A, an ECC logic 200 is shown in a simplified example for covering errors that may arise in four data bits d0, d1, d2, and d3. Here, three ECC bits p0, p1, and p2 are used to encode error information. The data bits and ECC bits are input to XOR gates to output a partial ECC result 210. In the illustrated example, three 4-input XOR gates are used for the seven bits (four data bits and three ECC bits) to output three bits S0, S1, and S2. Here, the partial ECC result 210 can be output of a first stage of a hamming code-based ECC algorithm and the three bits S0, S1, and S2 can be referred to as the syndrome.

As illustrated in more detail in FIG. 2B, an ECC algorithm using a hamming code includes encoding logic 250 and decoding logic 260. The decoding logic 260 can include syndrome computation (e.g., as implemented by the ECC logic 200), syndrome matching 262, and data correction 264. When data is stored in memory, the error information for the data is encoded in the form ECC bits p0, 01, and p3 using encoding logic 250 and stored along with the data in the memory. In some cases, ECC bits are provided for a particular data (e.g., for the data of a tag used in tag way halting) or across an entire row of data (e.g., which may contain information of multiple tags/ways).

Typically, the data and the ECC bits are read out from the memory and transferred to logic functions of the decoding logic 260 in a subsequent step (which may or may not be performed in parallel with next operations of a system and/or offline). However, as described herein, a portion of the decoding logic can be included in the memory itself (e.g., ECC logic 108 in memory circuitry 100) such that a partial ECC result 210 from ECC logic 200 is read out of the memory. Although an example hamming code ECC algorithm is shown, other error correcting code algorithms may be used (whether hamming code-based or not). Example ECC algorithms that may be used include, but are not limited to, hamming codes such as two-bit detect one-bit correct. Advantageously, by including the ECC logic of part of an ECC algorithm, it is not a requirement to read out both the data and the ECC bits in order to check for errors in the data. This capability enables power savings and supports the use of a two-phase tag way halting architecture.

As explained above, as part of a lookup operation to determine whether an address can be found in a cache near a processing unit, a portion of an incoming address (e.g., the portion providing the tag function) is compared to the stored data forming the tag in each way. A "hit" occurs when the incoming address data (e.g., the portion providing the tag function) matches the stored data (e.g., the "tag") in a way and the stored data is considered valid (e.g., as per appropriate state bit(s)). In a typical n-way set-associative cache, data belonging to an address will be in 0 or 1 of n places. Based on the hit of the incoming address and data of the tag RAMs, the data RAM cache memory location at the address of the matching stored data can be accessed. For a typical way-halting cache there is an attempt to reduce the number of bits of the tags that are accessed in each way. Thus, if there is any partial mismatch during the lookup (a "miss"), accesses to that way are halted, saving power.

Current way halting techniques and configurations can suffer from high energy consumption and area overhead due to duplication of efforts across many ways (e.g., as part of additional circuitry and parallel operations) and can suffer delay penalties due to routing hit signals across a chip to different banks and memories. In addition, the power consumption due to parallel accesses of multiple memories can be an issue. Current way halting techniques are frequency limiting by looking up the entire tag in the same access cycle. This creates a long cycletime and makes it unusable in modern designs.

In a two-phase tag way halting architecture as presented herein, a first part of the tag lookup is used to filter accesses to ways containing bits of the tag for the second part of the tag lookup by inhibiting access to memory of the ways that mismatch. The first part of the tag lookup uses a first set of bits of the tag and can be referred to as "preamble bits" or "preamble". The second part of the tag lookup uses a second set of bits of the tag and can be referred to as "prologue bits" or "prologue".

Figure 3:
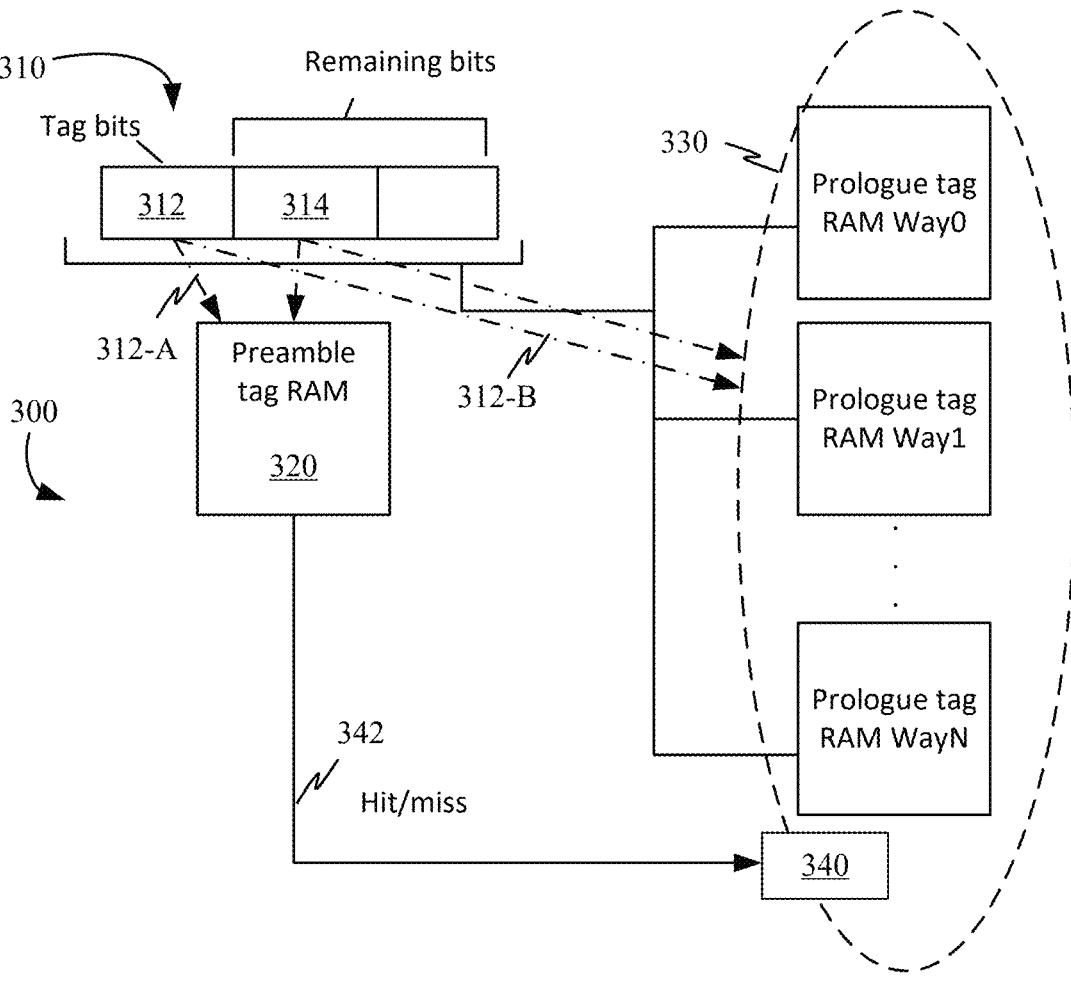
FIG. 3 shows a simplistic representation of a proposed two-phase access utilizing a memory architecture as described herein.

FIG. 3 shows a simplistic representation of a proposed two-phase access utilizing a memory architecture as described herein.

Referring to FIG. 3, an n-way cache 300 of a proposed memory architecture can include one or more preamble tag memories (e.g., preamble tag RAM 320) and one or more prologue tag memories/RAMs 330 for each preamble tag RAM 320 (where n is an integer greater than or equal to 1). A two-phase access is enabled by using the preamble tag RAM 320 to control access to the prologue tag memories 330 for the n ways.

First, a hit or miss of a first set of bits (e.g., preamble 312-A) of a tag portion 312 of an address 310 with respect to each way of a plurality of ways is determined at the preamble tag RAM 320 using the preamble 312-A and an index portion 314 of the address 310. Then, for each hit of the first set of bits, a corresponding way with stored prologue bits of the tags and remaining memory data information of the addresses is accessed and a hit or miss of the prologue 312-B of the tag portion 312 with respect to that corresponding way is determined using the prologue 312-B and the index portion 314 of the address 310 for lookup (e.g., with appropriate prologue tag memory accessed as enabled by selection logic 340 coupled to the prologue tag memories 330 that enables access to each of the prologue tag memories 330 under control of a hit or miss signal(s) 342 output from the preamble tag RAM 320).

Figure 4A:
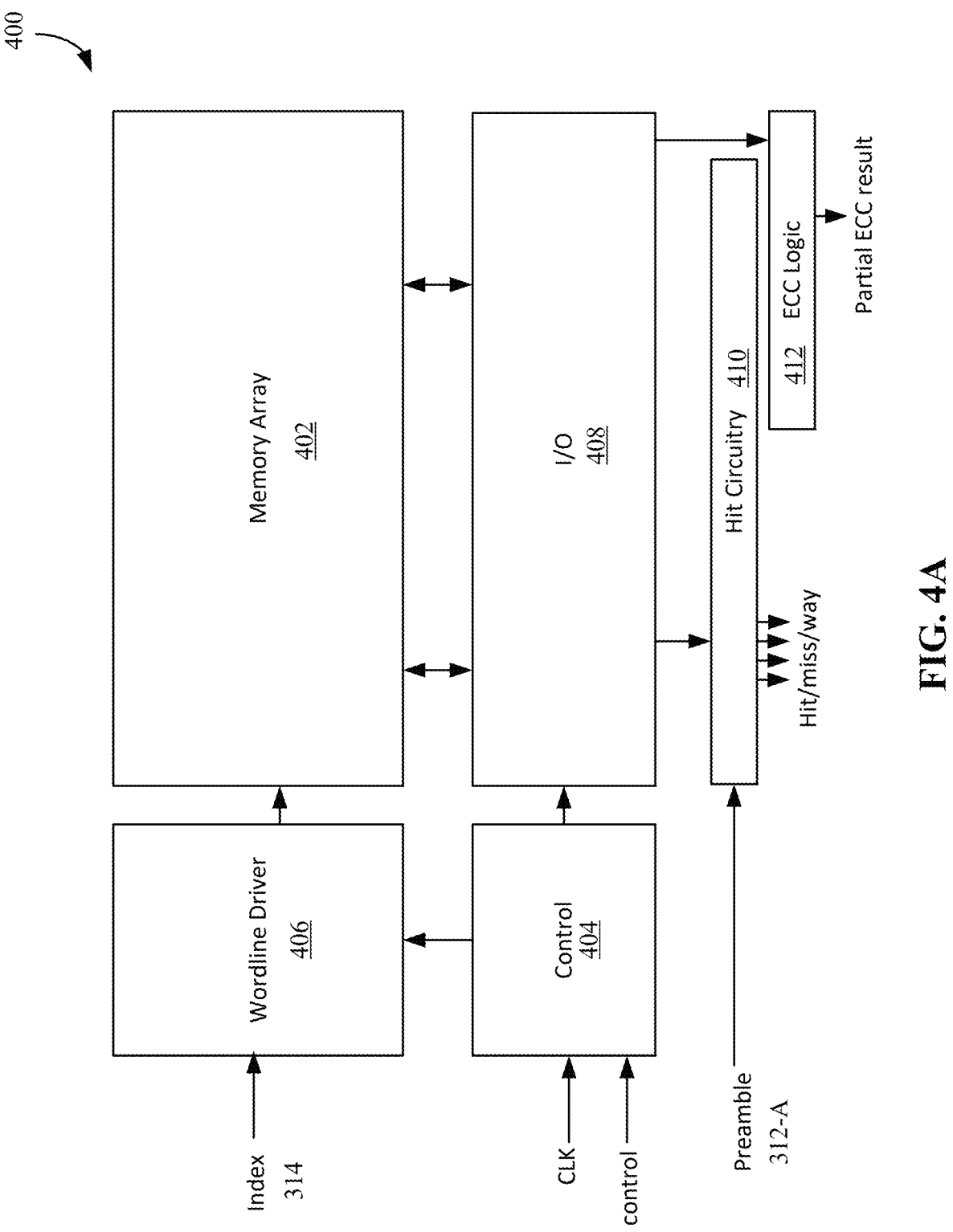
FIG. 4A illustrates a representational diagram of a memory circuitry that can be used in a first phase of tag way-halting as described herein.
Figure 4B:
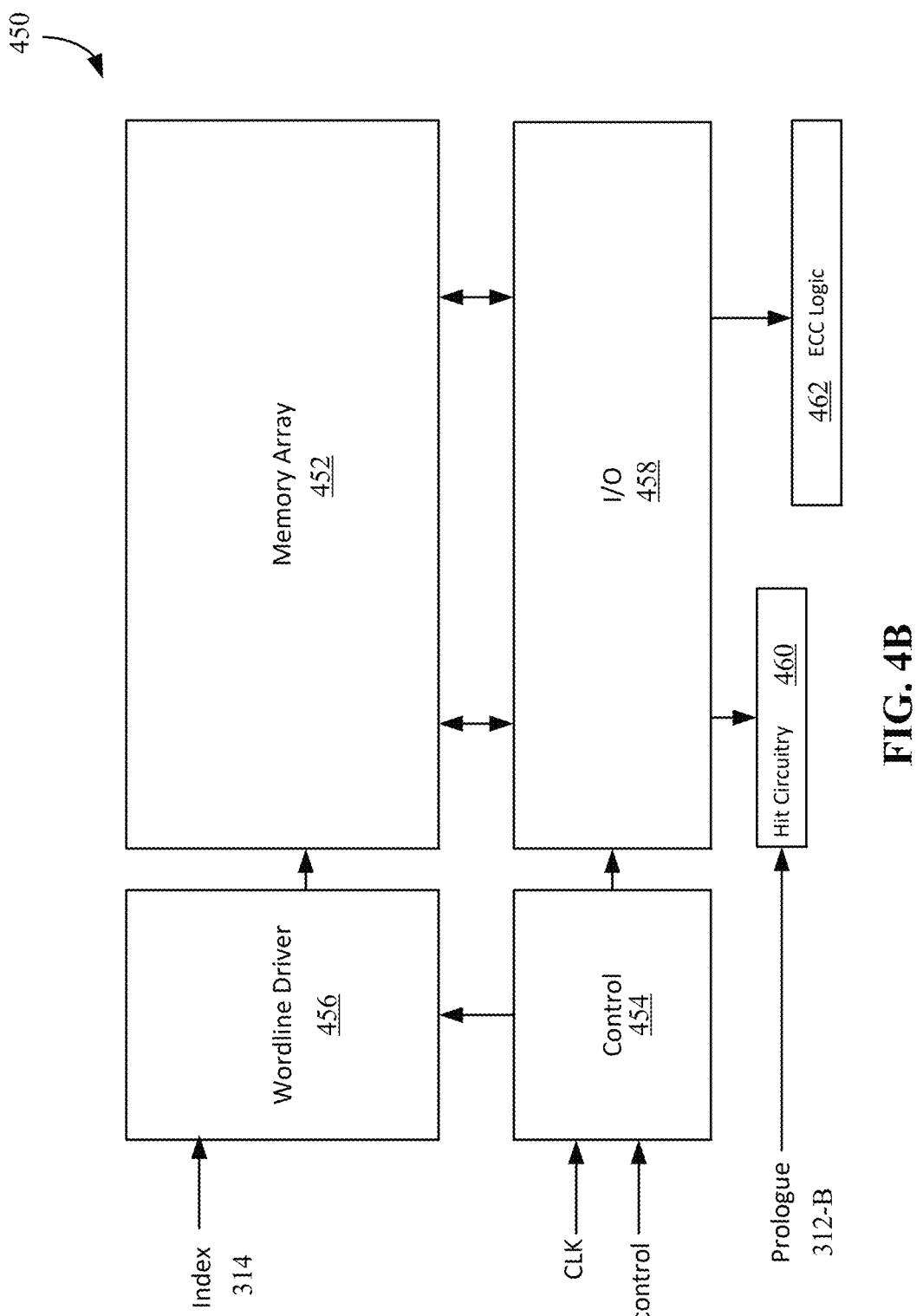
FIG. 4B illustrates a representational diagram of a memory circuitry that can be used in a second phase of tag way-halting as described herein.

In that manner, only the ways that correspond to the partial hit from the preamble tag RAM 320 are accessed in the prologue tag memory and the prologue 312-B of the address 310 is used to determine a fully complete, combined hit or miss for the address 310. An example implementation of preamble tag RAM 320 is shown in FIG. 4A. An example implementation of a prologue tag memory 330 is shown in FIG. 4B.

It should be understood that while n prologue tag RAMs are shown for n ways for illustrative purposes, more than one way may be combined in a same RAM. For example, two or more ways may be combined into one RAM. In addition, in some cases, more than one preamble tag RAM is provided in order to be able to store the preambles of all the ways.

FIG. 4A illustrates a representational diagram of a memory circuitry that can be used in a first phase of tag way-halting as described herein. Referring to FIG. 4A, memory circuitry 400 includes a memory array 402, a control circuit 404, wordline driver 406, input/output circuitry 408, and hit circuitry 410. Similar to memory circuitry 100 of FIG. 1, memory circuitry 400 includes optimized ECC architecture through the inclusion of ECC logic 412. ECC logic 412 performs a partial decoding of the outputs to output a partial ECC result that represents if there is an error and where that error is located. The ECC logic 412 can include syndrome computation logic (with the output being a syndrome) such as described with respect to FIG. 2A.

The memory array 402 is structured in an array of bitcells with rows accessed by wordlines and columns accessed by bitlines. Each bitcell refers to the memory element storing a single bit of information. In certain implementations, memory array 402 is static random-access memory (SRAM). The control circuit 404 provides control signals for operations of the memory circuitry 400. The wordline driver 406 receives an address and turns on a wordline indicated by the address in response to receiving a signal from the control circuit 404. The input/output circuitry 408 contains the read circuitry and write circuitry that utilize bitlines to read and write data out of and into the memory array 402. The hit circuitry 410 supports the determination of a hit/miss of the tag bits. ECC logic 412 supports certain parts of error correction processes within the memory circuitry 400. For example, ECC logic 412 can be coupled to receive outputs of a set of columns selected by read circuitry of the input/output circuitry 408, wherein the ECC logic performs a partial decoding of the outputs to output a partial ECC result that represents if there is an error and where that error is located in a row.

Figure 5A:
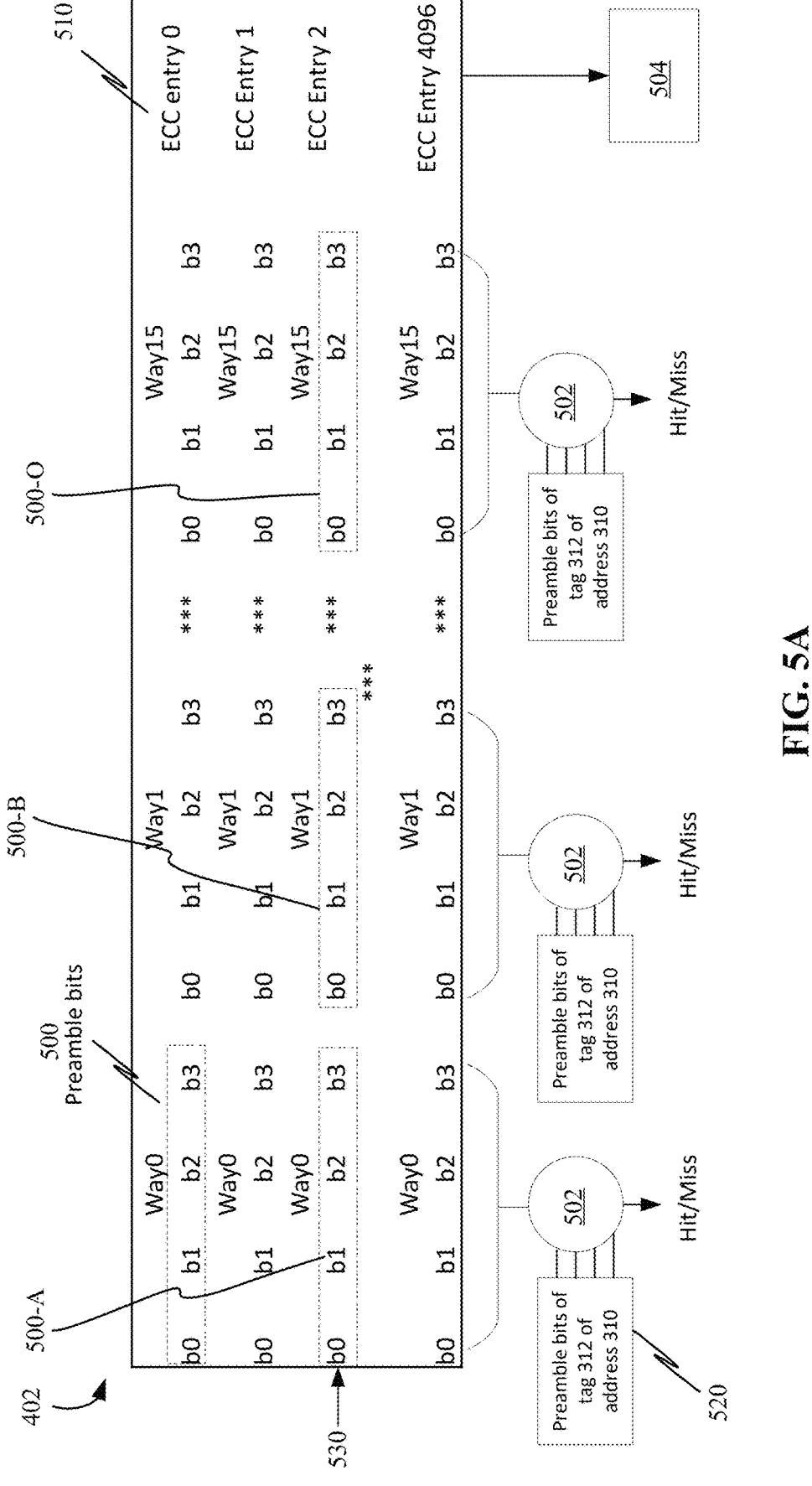
FIG. 5A illustrates an example of data that may be stored in a memory array of a way halting cache as described herein.

Accordingly, in the architecture of the n-way cache 300 described with respect to FIG. 3, memory array 402 functions as preamble tag RAM 320 by storing a set of tag bits of each of a plurality of the ways (e.g., the preamble portion). In addition to the preamble portions of a plurality of ways stored in each row of the memory array 402, a set of ECC bits are stored in each row. The ECC bits can encode any errors found in the entire row of data. FIG. 5A illustrates example data that may be stored in a memory array 402 implementing the preamble tag RAM 320. It can be seen with reference to FIG. 5A that a memory storing 4 bits for each of 16 ways is sufficiently covered by 6 ECC bits and that ECC logic 412 can be structured to generate a syndrome using the 70 bits of the data in a row.

In some cases, the set of tag bits of all the n ways are able to be stored in the memory array 402. In cases where the set of tag bits of all of the n ways are not able to be stored in the memory array 402 (e.g., due to there being more bits than available space), additional memory circuitry 400 (e.g., additional preamble tag RAM 320) can be provided for the preamble portions.

The first set of bits (e.g., the preamble) from the tag portion 312 of an address 310 is used by the hit circuitry 410 for determining a hit or miss of the first set of bits with respect to each way of the plurality of the ways covered by memory circuitry 400. For example, the hit circuitry 410 can be coupled to receive outputs of a second set of columns selected by the read circuitry of the input/output circuitry 408 and a set of tag bits of a received address for lookup for comparison.

Address bits ("index portion") from set portion 314 are used to select the appropriate wordline by wordline driver 406. The ECC logic 412 uses the ECC bits stored in the memory array 402 to carry out a partial operation of ECC operations (e.g., at least a portion of a detection operation). ECC bits are used to determine the integrity of the data (e.g., whether a value has flipped such as due to radiation, etc.) and can be used to perform error correction.

Accordingly, a method of operating a memory circuitry 400 with optimized error correction code architecture can include storing data and ECC bits encoding error information of the data in a memory array 402 of the memory circuitry 400; receiving an address (e.g., index bits from address 310) at the memory circuitry 400; selecting, by a wordline driver 406 coupled to receive the address, a corresponding wordline of the memory array; and performing, by ECC logic 412 of the memory circuitry 400, a partial decoding of output of a set of columns selected by read circuitry of the input/output circuitry 408 of the memory circuitry 400 to output a partial ECC result that represents if there is an error and where that error is located in a row corresponding to the corresponding wordline selected by the wordline driver 406, wherein the set of columns selected by the read circuitry of the input/output circuitry 408 correspond to columns in which the data and ECC bits are stored in the memory array 402.

The storing of the data and ECC bits in the memory array can include loading (e.g., using write circuitry of the input/output circuitry) preamble bits of a plurality of ways in the row of the memory array 402 and loading the ECC bits in the row, wherein the ECC bits encode error information across all bits of the preamble bits of the plurality of ways in the row. Then, when reading from the memory circuitry, the set of columns selected by the read circuitry correspond to the entire row, wherein the partial ECC result represents if there is an error in any of the preamble bits of any of the plurality of ways in the row and where that error is located in the row.

Advantageously, by incorporating the hit circuitry 410 and ECC logic 412 in memory circuitry 400, determining a hit or miss of the first set of bits with respect to each way of a plurality of ways and performing a partial error correction code operation can be performed in a same stage as a read operation of the memory circuitry 400. Furthermore, since the ECC logic 412 is included in the memory circuitry 400, the preamble bits and the ECC bits of an entire row do not need to be read out of the memory and transported across the chip to perform the error correction code algorithm logic. Rather, just the partial ECC result is output, which enables power savings and enables the benefits of performing hit operations within the memory circuitry to be fully realized.

FIG. 4B illustrates a representational diagram of a memory circuitry that can be used in a second phase of tag way-halting as described herein. Referring to FIG. 4B, memory circuitry 450 includes a memory array 452, a control circuit 454, wordline driver 456, input/output circuitry 458, hit circuitry 460, and ECC logic 462. Memory array 452, control circuit 454, wordline driver 456, and input/output circuitry 458 can be implemented such as described with respect to memory array 402, control circuit 404, wordline driver 406, and input/output circuitry 408 as described with respect to FIG. 4A. In addition, similar to that described with respect to FIG. 4A, the hit circuitry 460 and ECC logic 462 supports the determination of a hit/miss of the tag bits for a way and certain parts of error correction processes within the memory circuitry 450. For example, ECC logic 462 can be coupled to receive outputs of a set of columns selected by the read circuitry of the input/output circuitry 458, wherein the ECC logic performs a partial decoding of the outputs to output a partial ECC result that represents if there is an error and where that error is located in a row. However, different than that described with respect to FIG. 4A, the hit circuitry 460 and ECC logic 462 can be structured to support operations with respect to the prologue bits and memory data information that are to be stored in memory circuitry 450.

Figure 5B:
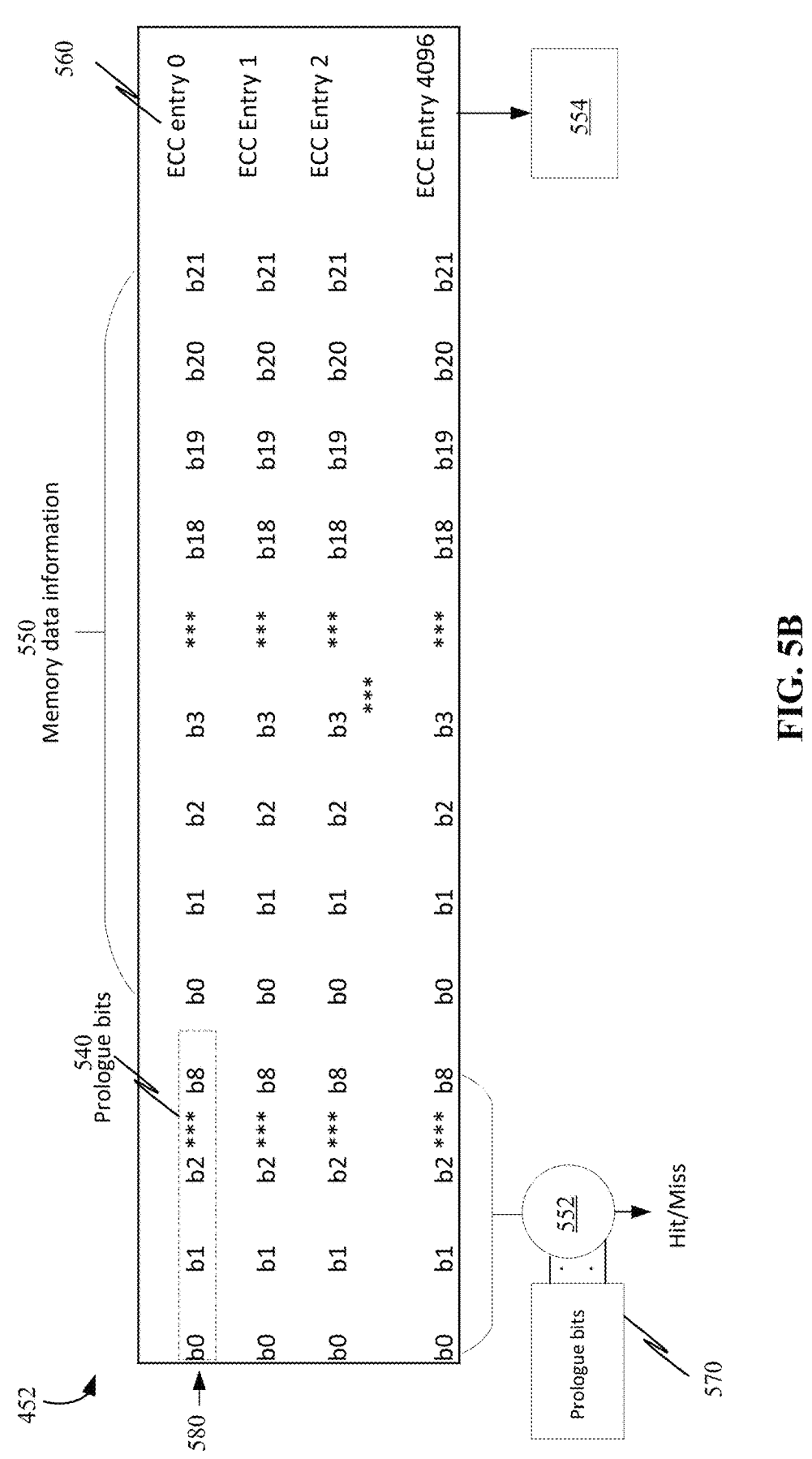
FIG. 5B illustrates another example of data that may be stored in a memory array of a way halting cache as described herein.

As mentioned above, for each partial hit of the preamble performed in the first phase, a corresponding way is accessed, and determination of a hit or miss is performed using the prologue bits. Here, in the architecture of the n-way cache 300 described with respect to FIG. 3, memory array 452 stores the prologue portion of a tag and other bits of the address/memory data information in the RAM corresponding to that way. FIG. 5B illustrates example data that may be stored in a memory array 452 of a memory storing prologue bits (e.g., prologue tag memory 330). Accordingly, the second set of bits (e.g., prologue 312-B) from the tag portion 312 can be used by the hit circuitry 460 to determine a hit or miss of the prologue bits. For example, the hit circuitry 460 can be coupled to receive outputs of a second set of columns selected by the read circuitry of the input/output circuitry 458 and a set of tag bits (e.g., the prologue 312-B) of a received address for lookup for comparison. In this way, the prologue bits are only accessed in the second phase when there is a partial hit on the preamble bits. Similar to that described with respect to FIG. 4A, address bits ("index portion") from set portion 314 are used to select the appropriate wordline by wordline driver 456.

The ECC logic 462 uses the ECC bits stored in the memory array 452 to carry out a partial operation of ECC operations (e.g., at least a portion of a detection operation). It can be seen with reference to FIG. 5B that a memory storing 9 bits of prologue and 22 state bits for a way is sufficiently covered by 6 ECC bits and that ECC logic 462 can be structured to generate a syndrome using the 37 bits of the data for one way. Furthermore, it can be possible to use the 6 ECC bits to cover more than one way if more than one way is stored in a row. For example, 6 ECC bits could cover two ways where each way includes the 9 bits of prologue and 22 state bits and the ECC logic 462 is structured to generate a syndrome using the 68 bits.

Accordingly, a method of operating a memory circuitry 450 with optimized error correction code architecture can include storing data and ECC bits encoding error information of the data in a memory array 452 of the memory circuitry 450; receiving an address (e.g., index bits from address 310) at the memory circuitry 450; selecting, by a wordline driver 456 coupled to receive the address, a corresponding wordline of the memory array; and performing, by ECC logic 462 of the memory circuitry 450, a partial decoding of output of a set of columns selected by read circuitry of the input/output circuitry 458 of the memory circuitry 450 to output a partial ECC result that represents if there is an error and where that error is located in a row corresponding to the corresponding wordline selected by the wordline driver 456, wherein the set of columns selected by the read circuitry of the input/output circuitry 458 correspond to columns in which the data and ECC bits are stored in the memory array 452.

In some cases, the storing the data and ECC bits in the memory array can include loading (e.g., using write circuitry of the input/output circuitry 458) prologue bits and memory data information of a way of a plurality of ways in the row of the memory array and loading the ECC bits in the row, wherein the ECC bits encode error information across all bits of the way in the row. In some cases, the set of columns selected by the read circuitry correspond to columns storing the prologue bits, the memory data information of the way, and the ECC bits for the data of the way, wherein the partial ECC result represents if there is an error in data for the way and where that error is located in the row.

In some cases, the storing the data and ECC bits in the memory array can include loading (e.g., using write circuitry of the input/output circuitry 458) prologue bits and memory data information of two ways of a plurality of ways in the row of the memory array and loading the ECC bits in the row, wherein the ECC bits encode error information across all bits of the two ways in the row.

Advantageously, by incorporating the hit circuitry 460 and ECC logic 462 in memory circuitry 450, determining a hit or miss of the remaining bits from the tag portion of the address at a particular way and performing a partial error correction code operation can be performed in a same subsequent cycle to the first phase and this subsequent cycle can be part of a read operation of the memory circuitry 450.

Accordingly, by incorporating additional logic within the RAM used for a Way Halting Cache, it is possible to minimize the timing delays caused by the slow speed of current memories as compared to the increased operational speed of logic circuitry when having to first read out all of the bits in the RAM before performing logic operations to complete a lookup operation in the Way Halting Cache. Furthermore, by reducing the number of RAMs being accessed, additional power savings can be achieved.

FIG. 5A illustrates an example of data that may be stored in a memory array of a way halting cache as described herein. Referring to FIG. 5A, data within memory array 402 can include the preamble bits 500 from a plurality of ways (and may include the preamble bits from all available ways). In the example, preamble bits of a 16-way cache are shown. Here, four bits of the tag (b0, b1, b2, b3) are stored as the preamble for each way (Way0, Way1, . . . , Way 15) in a row of the memory array 402. In addition, ECC bits 510 are stored, covering the preambles of all sixteen ways. In such a case, 6 ECC bits may be used as an example.

Accordingly, with reference to both FIG. 5A and FIG. 4A, hit circuitry 410 can compare (502) all the preamble bits in the row to the preamble bits 520 from the address 310. For example, for row 530, preamble bits 500-A of Way0, preamble bits 500-B of Way1, all the way to preamble bits 500-O of Way15 are each compared (502) to preamble bits 520 (e.g., of tag 312 of address 310). In addition, the ECC logic 412 can be used to perform a first partial error correction code operation (504) utilizing the ECC bits 510 for that row.

FIG. 5B illustrates another example of data that may be stored in a memory array of a way halting cache as described herein. Referring to FIG. 5B, data within memory array 452 can include the prologue bits 540, memory data information 550, and ECC bits 560 for each row (whether one or more ways are in the RAM) or per way in a row. In the example, 9 prologue bits (based on 4 preamble bits of a 13-bit tag being in a preamble tag RAM), 22 bits of the remaining address information, and corresponding ECC bits are stored in each entry. Six ECC bits may be used as an example.

Accordingly, with reference to both FIG. 5B and FIG. 4B, hit circuitry 460 can compare (552) the prologue bits 540 of an entry (e.g., a row 580) to the prologue bits 570 from the address 310. In addition, the ECC logic 462 can be used to perform a first partial error correction code operation (554) utilizing the ECC bits 560 for that entry (e.g., covering the prologue bits and remaining address information).

It should be understood that for the examples shown in FIGS. 5A and 5B, the distribution of tag bits into the preamble and prologue is for illustrative purposes only. Selection of the number of bits to be preamble bits can be based on optimizations for energy consumption and area as some examples.

As can be apparent from the example data shown in FIGS. 5A and 5B and with reference to FIG. 3, a logical model of an address includes a tag portion, a set portion, and a data portion. The tag portion contains the tag bits. When an address arrives at the cache/memory subsystem for lookup against the addresses stored in the cache/memory subsystem, tag bits of the tag portion of the arriving address (e.g., tag portion 312 of arriving address 310) are used to check against the tag bits stored in the preamble tag RAM 320 and, depending on the resulting partial hit(s), against the tag bits of the addresses stored in the prologue tag RAM(s) 330). For an arriving address 310, the set portion 314 includes address bits ("index portion"), which can be used to access appropriate cells in memory (e.g., as an index for wordline/row selection). The data portion of an address can include various information bits. The information bits in a stored data portion can include ECC bits (e.g., ECC bits 510, 560), a valid bit (e.g., whether the data is valid/meaningful), and security bits, as some examples. In some current technologies, the tag portion of an address includes 13 bits and the set portion of an address includes 13 bits. The number of bits in the data portion is dependent on the size of the cacheline (and can be considered sub-cacheline address bits).

Certain embodiments of the illustrated methods and circuitry include the following.

Clause 1. A memory circuitry comprising: a memory array; a wordline driver, the wordline driver structured to receive an address and select a corresponding wordline of the memory array; read circuitry coupled to bitlines of the memory array; and error correction code (ECC) logic coupled to a set of columns to receive outputs of the set of columns selected by the read circuitry, wherein the ECC logic performs a partial decoding of the outputs to output a partial ECC result that represents if there is an error and where the error is located.

Clause 2. The memory circuitry of clause 1, wherein the set of columns to which the ECC logic is coupled is a specific number of columns set aside for storing ECC bits.

Clause 3. The memory circuitry of clause 1 or 2, wherein the memory array is structured to store a plurality of ECC bits in each row, the set of columns coupled to the ECC logic are columns corresponding to a location of the ECC bits of each row.

Clause 4. The memory circuitry of any preceding clause, wherein the ECC logic comprises syndrome computation logic and the partial ECC result is a syndrome.

Clause 5. The memory circuitry of clause 4, wherein the ECC logic comprises part of a hamming code logic.

Clause 6. The memory circuitry of any preceding clause, wherein the ECC logic comprises partial decoding operations.

Clause 7. The memory circuitry of any preceding clause, wherein the ECC logic comprises XOR gates.

Clause 8. The memory circuitry of any preceding clause, further comprising hit circuitry structured to receive outputs of a second set of columns selected by the read circuitry and a set of tag bits of a received address for lookup for comparison.

Clause 9. A method of operating a memory circuitry, the method comprising: storing data and error correction code (ECC) bits encoding error information of the data in a memory array of the memory circuitry; receiving an address at the memory circuitry; selecting, by a wordline driver structured to receive the address, a corresponding wordline of the memory array; and performing, by ECC logic of the memory circuitry, a partial decoding of output of a set of columns selected by read circuitry of the memory circuitry to output a partial ECC result that represents if there is an error and where that error is located, wherein the set of columns selected by the read circuitry correspond to columns in which the data and ECC bits are stored in the memory array.

Clause 10. The method of clause 9, wherein storing the data and ECC bits in the memory array comprises: loading preamble bits of a plurality of ways in a row of the memory array and loading the ECC bits in the row, wherein the ECC bits encode error information across all bits of the preamble bits of the plurality of ways in the row.

Clause 11. The method of clause 10, wherein the set of columns selected by the read circuitry correspond to all columns of the memory array, wherein the partial ECC result represents if there is an error in any of the preamble bits of any of the plurality of ways in the row and where that error is located in the row.

Clause 12. The method of clause 9, wherein storing the data and ECC bits in the memory array comprises: loading prologue bits and memory data information of a way of a plurality of ways in a row of the memory array and loading the ECC bits in the row, wherein the ECC bits encode error information across all bits of the way in the row.

Clause 13. The method of clause 12, wherein the set of columns selected by the read circuitry correspond to columns storing the prologue bits, the memory data information of the way, and the ECC bits, wherein the partial ECC result represents if there is an error in data for the way and where that error is located in the row.

Clause 14. The method of any of clauses 9, 12, or 13, wherein storing the data and ECC bits in the memory array comprises: loading prologue bits and memory data information of two ways of a plurality of ways in a row of the memory array and loading the ECC bits in the row, wherein the ECC bits encode error information across all bits of the two ways in the row.

Clause 15. The method of any of clauses 9-14, wherein the set of columns to which the ECC logic is coupled is a specific number of columns set aside for storing ECC bits.

Clause 16. The method of any of clauses 9-15, wherein the memory array is structured to store a plurality of ECC bits in each row, the set of columns coupled to the ECC logic being a plurality of columns corresponding to a location of the plurality of ECC bits of each row.

Clause 17. The method of any of clauses 9-16, wherein the ECC logic comprises syndrome computation logic and the partial ECC result is a syndrome.

Clause 18. The method of clause 17, wherein the ECC logic comprises part of a hamming code logic.

Clause 19. The method of any of clauses 9-18, wherein the ECC logic comprises partial decoding operations.

Clause 20. The method of any of clauses 9-19, wherein the ECC logic comprises XOR gates.

Clause 21. The method of any of clauses 9-20 in which two or more of such memories are operated, at least one for preamble bits and at least one for prologue bits.

Although the subject matter has been described in language specific to structural features and/or acts, it is to be understood that the subject matter defined in the appended claims is not necessarily limited to the specific features or acts described above. Rather, the specific features and acts described above are disclosed as examples, implementing the claims and other equivalent features and acts; they are intended to be within the scope of the claims.

What is claimed is:

1. A memory circuitry comprising:
a memory array;
a wordline driver, the wordline driver structured to receive an address and select a corresponding wordline of the memory array;
read circuitry coupled to bitlines of the memory array; and
error correction code (ECC) logic coupled to a set of columns to receive outputs of the set of columns selected by the read circuitry, wherein the ECC logic performs a partial decoding of the outputs to output a partial ECC result that represents if there is an error and where the error is located.

2. The memory circuitry of claim 1,
wherein the set of columns to which the ECC logic is coupled is a specific number of columns set aside for storing ECC bits.

3. The memory circuitry of claim 1,
wherein the memory array is structured to store a plurality of ECC bits in each row, the set of columns coupled to the ECC logic are columns corresponding to a location of the ECC bits of each row.

4. The memory circuitry of claim 1, wherein the ECC logic comprises syndrome computation logic and the partial ECC result is a syndrome.

5. The memory circuitry of claim 4, wherein the ECC logic comprises part of a hamming code logic.

6. The memory circuitry of claim 1, wherein the ECC logic comprises partial decoding operations.

7. The memory circuitry of claim 1, wherein the ECC logic comprises XOR gates.

8. The memory circuitry of claim 1, further comprising hit circuitry structured to receive outputs of a second set of columns selected by the read circuitry and a set of tag bits of a received address for lookup for comparison.

9. The memory circuitry of claim 1, wherein the partial ECC result is output in place of ECC bits stored in the memory array during a read operation.

10. The memory circuitry of claim 1, wherein the outputs of the set of columns selected by the read circuitry are ECC bits stored in a row of the memory array, the ECC bits being for a particular data corresponding to one way of a plurality of ways or across an entire row of data corresponding to more than one way of the plurality of ways.

11. A method of operating a memory circuitry, the method comprising:
storing data and error correction code (ECC) bits encoding error information of the data in a memory array of the memory circuitry, wherein storing the data and ECC bits in the memory array comprises:
loading preamble bits of a plurality of ways in a row of the memory array and loading the ECC bits in the row, wherein the ECC bits encode error information across all bits of the preamble bits of the plurality of ways in the row;
receiving an address at the memory circuitry;
selecting, by a wordline driver structured to receive the address, a corresponding wordline of the memory array; and
performing, by ECC logic of the memory circuitry, a partial decoding of output of a set of columns selected by read circuitry of the memory circuitry to output a partial ECC result that represents if there is an error and where that error is located, wherein the set of columns selected by the read circuitry correspond to columns in which the data and ECC bits are stored in the memory array.

12. The method of claim 11, wherein the set of columns selected by the read circuitry correspond to all columns of the memory array, wherein the partial ECC result represents if there is an error in any of the preamble bits of any of the plurality of ways in the row and where that error is located in the row.

13. The method of claim 11, wherein the ECC logic comprises syndrome computation logic and the partial ECC result is a syndrome.

14. The method of claim 13, wherein the ECC logic comprises part of a hamming code logic.

15. The method of claim 11, wherein the ECC logic comprises partial decoding operations.

16. The method of claim 11, wherein the ECC logic comprises XOR gates.

17. A method of operating a memory circuitry, the method comprising:

storing data and error correction code (ECC) bits encoding error information of the data in a memory array of the memory circuitry, wherein storing the data and ECC bits in the memory array comprises:

loading prologue bits and memory data information of one or more ways of a plurality of ways in a row of the memory array and loading the ECC bits in the row, wherein the ECC bits encode error information across all bits of the one or more ways in the row;

receiving an address at the memory circuitry;

selecting, by a wordline driver structured to receive the address, a corresponding wordline of the memory array; and performing, by ECC logic of the memory circuitry, a partial decoding of output of a set of columns selected by read circuitry of the memory circuitry to output a partial ECC result that represents if there is an error and where that error is located, wherein the set of columns selected by the read circuitry correspond to columns in which the data and ECC bits are stored in the memory array.

18. The method of claim 17, wherein the set of columns selected by the read circuitry correspond to columns storing the prologue bits, the memory data information of the way, and the ECC bits, wherein the partial ECC result represents if there is an error in data for the way and where that error is located in the row.

19. The method of claim 17, wherein the ECC logic comprises syndrome computation logic and the partial ECC result is a syndrome.

20. The method of claim 17, wherein the ECC logic comprises partial decoding operations.

* * * * *